United States Patent
Adams et al.

(10) Patent No.: US 12,391,265 B2
(45) Date of Patent: Aug. 19, 2025

(54) POSE COMPONENT

(71) Applicant: Zoox, Inc., Foster City, CA (US)

(72) Inventors: Derek Adams, Pasadena, CA (US); Gregory D. Kravit, San Diego, CA (US); Chengzhi Winston Liu, Belmont, CA (US); Brice Rebsamen, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/491,091

(22) Filed: Sep. 30, 2021

(65) Prior Publication Data

US 2023/0097251 A1  Mar. 30, 2023

(51) Int. Cl.
*B60W 50/02* (2012.01)
*B60W 50/00* (2006.01)
*G01C 21/28* (2006.01)

(52) U.S. Cl.
CPC .... *B60W 50/0225* (2013.01); *B60W 50/0205* (2013.01); *G01C 21/28* (2013.01); *B60W 2050/0083* (2013.01); *B60W 2050/0215* (2013.01)

(58) Field of Classification Search
CPC ......... B60W 50/0225; B60W 50/0205; B60W 2050/0083; B60W 2050/0215; G01C 21/28
See application file for complete search history.

(56) References Cited

U.S. PATENT DOCUMENTS

| | | | |
|---|---|---|---|
| 9,915,947 B1 | 3/2018 | Laforege | |
| 9,916,703 B2* | 3/2018 | Levinson | G08G 1/207 |
| 10,108,192 B1* | 10/2018 | LaForge | G05D 1/0077 |
| 10,502,819 B2* | 12/2019 | Chon | G01S 17/86 |
| 10,782,411 B2* | 9/2020 | Ahn | G01S 5/163 |
| 10,831,188 B2* | 11/2020 | Hammond | G05D 1/0055 |
| 11,530,920 B2* | 12/2022 | Krone | G01S 19/49 |
| 11,536,569 B2* | 12/2022 | Leach | G01S 17/931 |
| 11,639,981 B2* | 5/2023 | Wu | H04W 4/021 342/28 |
| 11,835,342 B2* | 12/2023 | Zeng | G01C 25/005 |

(Continued)

FOREIGN PATENT DOCUMENTS

| | | |
|---|---|---|
| CN | 112572459 A | 3/2021 |
| KR | 20080112462 A | 12/2008 |

OTHER PUBLICATIONS

PCT Search Report and Written Opinion mailed Jan. 19, 2023 for PCT Application No. PCT/US22/45356, 11 pages.

*Primary Examiner* — Aniss Chad
*Assistant Examiner* — Christopher George Fees
(74) *Attorney, Agent, or Firm* — Lee & Hayes, P.C.

(57) ABSTRACT

Techniques for a pose component that may determine a pose are described herein. A pose may refer to the inertial pose or position of a vehicle which may be updated in real-time or near real-time. For example, the techniques may include receiving a plurality of input signals at a pose component and monitoring the plurality of input signals. The pose component may determine, based on the monitoring of the plurality of input signals, a particular pose update algorithm of a plurality of pose update algorithms for determining the pose and determine, using the particular pose update algorithm, the pose based the plurality of input signals and IMU measurements associated with a primary IMU.

18 Claims, 9 Drawing Sheets

(56) References Cited

U.S. PATENT DOCUMENTS

| | | | |
|---|---|---|---|
| 2011/0187546 A1 | 8/2011 | Liberman | |
| 2013/0222115 A1* | 8/2013 | Davoodi | H04Q 9/00 340/10.1 |
| 2016/0377437 A1* | 12/2016 | Brannstrom | G05D 1/0274 701/501 |
| 2017/0043785 A1 | 2/2017 | Chen | |
| 2018/0206099 A1* | 7/2018 | O'Connor | G01K 1/026 |
| 2019/0138000 A1* | 5/2019 | Hammond | G05D 1/0212 |
| 2020/0211394 A1* | 7/2020 | King | B60W 50/023 |
| 2020/0339151 A1* | 10/2020 | Batts | G05D 1/0214 |
| 2020/0386782 A1* | 12/2020 | Lee | G01P 21/00 |
| 2021/0024081 A1* | 1/2021 | Johnson-Roberson | G01C 25/00 |
| 2021/0123754 A1* | 4/2021 | Mordechai | G05D 1/027 |
| 2021/0364652 A1* | 11/2021 | Spasovski | G01S 19/23 |
| 2022/0187843 A1* | 6/2022 | Wang | G01C 21/1656 |
| 2022/0227380 A1* | 7/2022 | Griffith | G06T 7/246 |
| 2022/0390622 A1* | 12/2022 | Seth | G01S 19/47 |

\* cited by examiner

| EMU-1 | EMU-2 | EMU-3 | Active IMU | Operational Outcome |
|---|---|---|---|---|
| H | H | H | 1 | Go |
| X | H | H | 2 | Go |
| H | X | H | 1 | Go |
| H | H | X | 1 | Go |
| X | X | H | Secondary | Secondary-NoGo |
| X | H | X | Secondary | Secondary-NoGo |
| H | X | X | Secondary | Secondary-NoGo |
| X | X | X | Secondary | Secondary Response |

FIG. 6

POSE COMPONENT

BACKGROUND

A vehicle may include various sensors, which may be utilized for many different purposes. For example, sensors may be used to detect information about a surrounding environment (e.g., other vehicles, roadway conditions, pedestrians, street signs, etc.), as well as to monitor vehicle operations (e.g., braking, accelerating, steering, system(s) status, vehicle position, etc.). In some instances, sensor data may be consumed by downstream operations. For example, inertial measurement units may provide inertial measurements that may be used for localization processes or other determinations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 illustrates an example table that illustrates an example failover logic that may be utilized by the IMU failover component to determine a primary inertial measurement unit (IMU).

DETAILED DESCRIPTION

Figure 1:
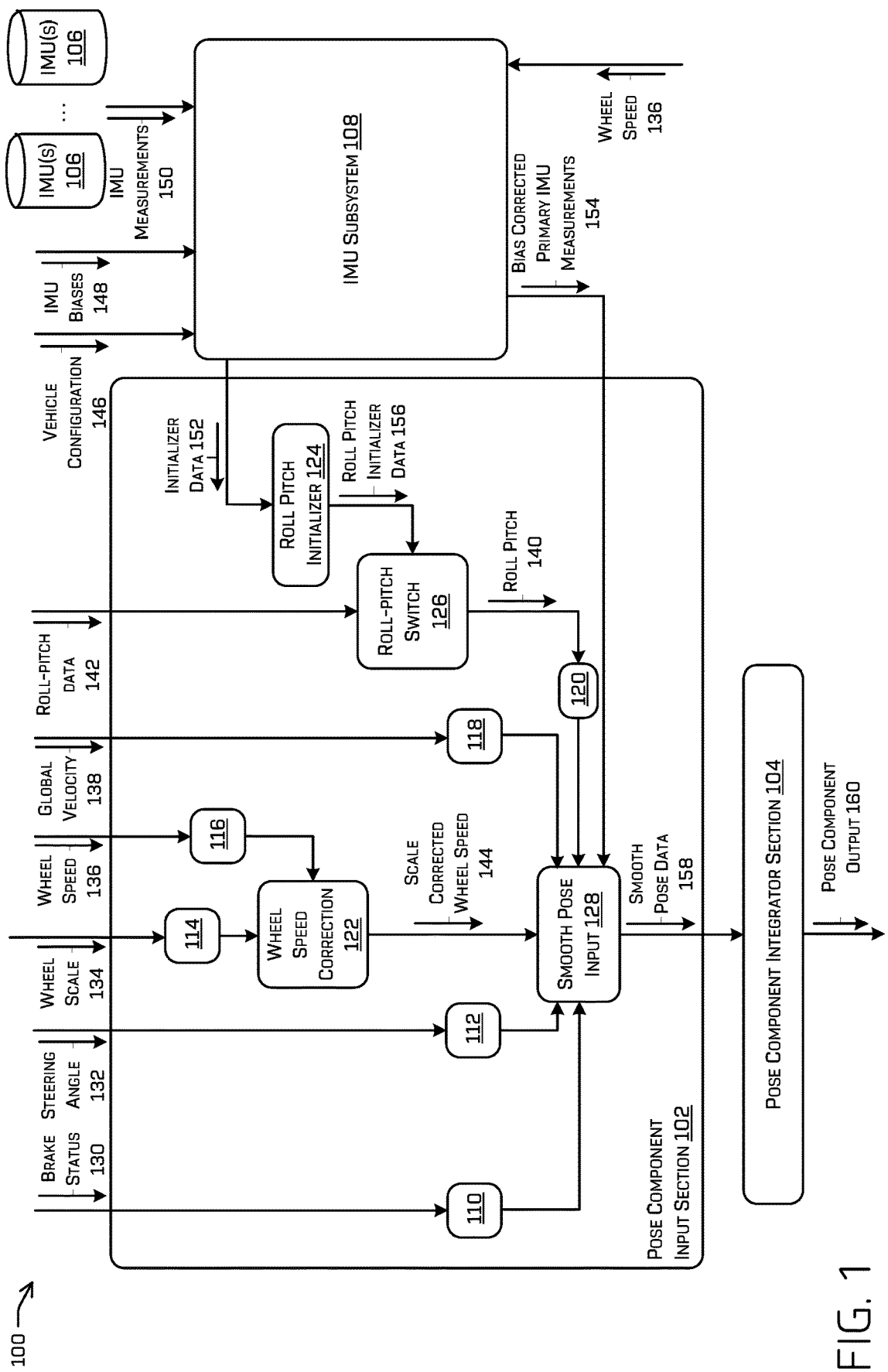
FIGS. 1-3 illustrate example views of an architecture in which the techniques discussed herein may be implemented.

This disclosure is directed to systems and techniques that provide a pose component that may output a smooth pose of, for example, an autonomous vehicle, that may be used in, for example, localization and navigation tasks (including, for example, control) of the autonomous vehicle. As used herein, the pose component may include a high frequency subcomponent (e.g., 100 Hertz, 200 Hertz, etc.) configured to determine a location and/or velocity of a vehicle operating in an environment based at least in part on inertial sensor data captured by one or more inertial sensors such as inertial measurement units (IMUs). More particularly, some examples may include a pose component that may receive IMU measurements from a plurality of IMUs. In some examples, the pose component may be a subcomponent of a localization component of an autonomous vehicle.

A smooth pose may refer to the inertial pose or position of an autonomous vehicle which may be updated in real-time or near real-time. According to some examples, data describing a smooth pose may include one or more of an x-coordinate, a y-coordinate, a z-coordinate (or any coordinate of any coordinate system, including polar or cylindrical coordinate systems, or the like), a yaw value, a roll value, a pitch value (e.g., an angle value), a rate (e.g., velocity), altitude, and the like. Smooth pose may be calculated or otherwise determined using sensor inputs such as steering angle, wheel speeds, and/or IMU measurements.

In some examples herein, the pose component may include a signal monitoring system and a switchable state-estimator. In some examples, the pose component may be a reliable source of smooth pose that may be robust to the loss of input sensors. More particularly, the pose component may be fail-operational on the loss of IMU measurements of one or more of a plurality of IMUs (e.g., despite a failure, the vehicle may continue to successfully continue operations safely) and fail-safe on the loss of other input measurements (e.g., the vehicle may be put into a state in which any passengers or surroundings may be safe despite the vehicle being unable to operate fully).

The signal monitoring system of the pose component may monitor inputs received by the pose component for staleness (how old a input signal is) and plausibility (e.g., a determination of how likely the given input is to be accurate) and apply scale-correction to one or more of the inputs. For example, the staleness and plausibility of inputs may be monitored to determine if a predefined threshold level of staleness or plausibility has been exceeded. In this way, the signal monitoring component may ensure verified data is utilized by the pose component to generate the smooth pose.

The pose component may receive IMU measurements from a plurality of IMUs. The signal monitoring system of the pose component may monitor the IMUs for staleness and plausibility as well as determine a primary IMU from among the plurality of IMUs. In some examples, the pose component may determine the primary IMU by checking the measurements from the plurality of IMUs against one another and determining the primary IMU based on a consensus method. The data of the primary IMU may be utilized in determining the smooth pose.

The switchable state-estimator of the pose component may generate a smooth pose based on the inputs that were previously screened by the signal monitoring component. In some examples, the pose component may provide for a switchable smooth pose determination that may be switched between a robust determination (e.g., using an extended Kalman filter (EKF) or other Bayesian filter) method and a simple determination method (e.g., updates based on dead reckoning). The robust determination may provide more robust information (e.g., the robust determination method may capture the Z motion of the vehicle (e.g., speed bumps, potholes, etc.), the robust determination may be robust to wheel slip, etc.) whereas the simple determination method may not. The simple determination method may be more computationally efficient and less dependent on inputs. For example, the simple determination method may take fewer input from fewer sources than the robust determination method and may be less susceptible to temporary data loss.

The techniques discussed herein may improve the functioning of an autonomous and/or semi-autonomous vehicle in many ways. In some examples, the pose component may be a reliable source of smooth pose that may be robust to the loss of input sensors. More particularly, the pose component may be fail-operational on the loss of IMU measurements of one or more of a plurality of IMUs and fail-safe on the loss of other input measurements. Further, the switchable smooth pose estimation of the pose component may provide robust data when desired while allowing for a switch to a more computationally simple method that may be more robust against failure if data becomes stale, implausible or lossy. By providing a reliable source of smooth pose, the reliability of the autonomous vehicle and the safety of the passengers may be improved.

For example, the robust determination may utilize a Kalman velocity estimator that operates on a first computing device, while the simple determination may utilize a simple integrator that may operate on a second computing device. In operation, when the Kalman velocity estimate is invalid (e.g., because the IMUs are corrupted or the first computing device has failed), the simple integrator may be used to estimate the velocity, which in turn may be used to execute a safe-stop trajectory to bring the vehicle to a stop.

Additional details and variations of the pose component are provided below with reference to the following figures.

The methods, apparatuses, and systems described herein can be implemented in a number of ways. Example implementations are provided below with reference to the following figures. Although discussed in the context of an autonomous vehicle system in some examples below, the methods, apparatuses, and systems described herein can be applied to a variety of systems. Additionally, or alternatively, the techniques described herein can be used with real data (e.g., captured using sensor(s)), simulated data (e.g., generated by a simulator), or any combination thereof.

Figure 2:
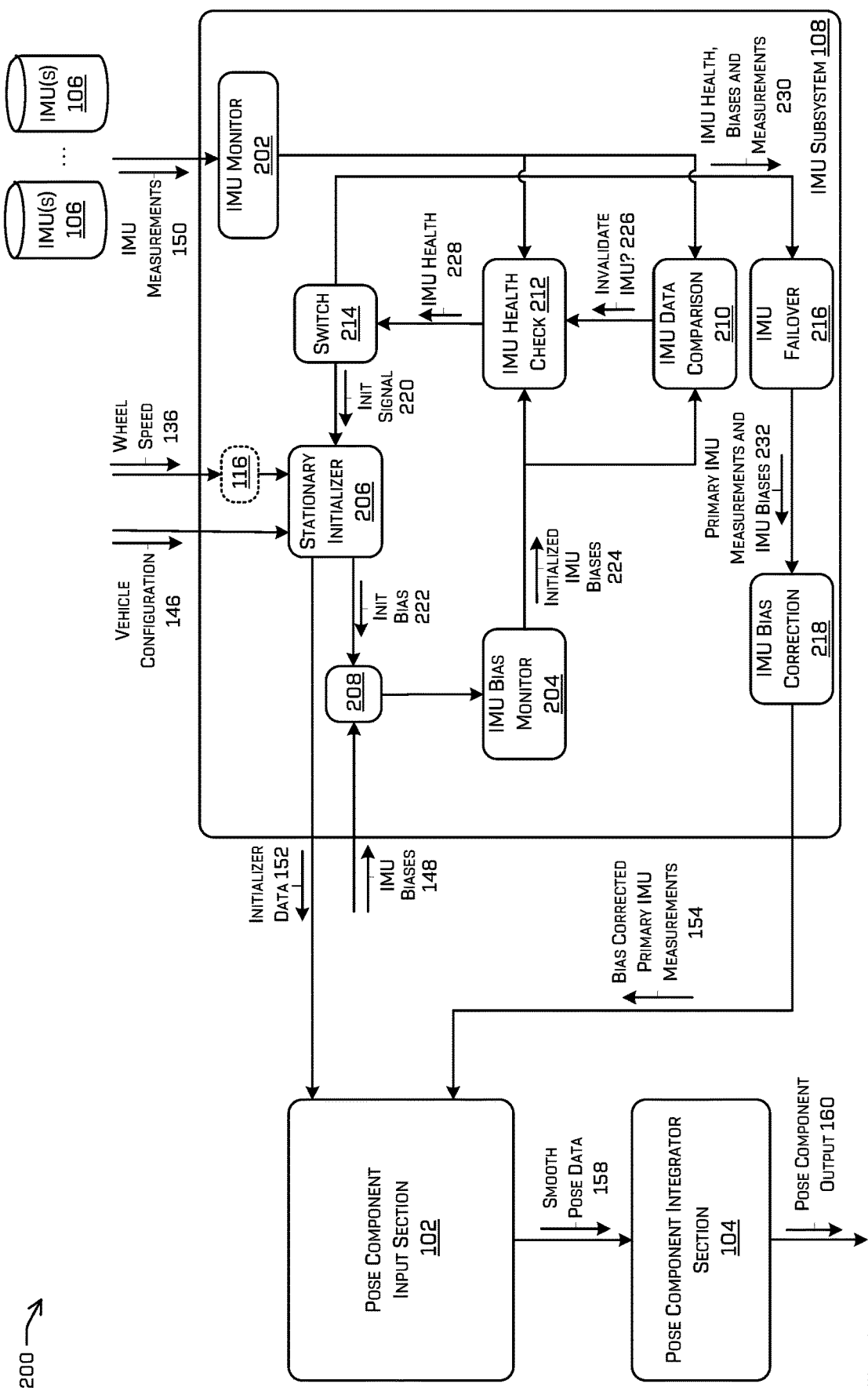
Figure 3:
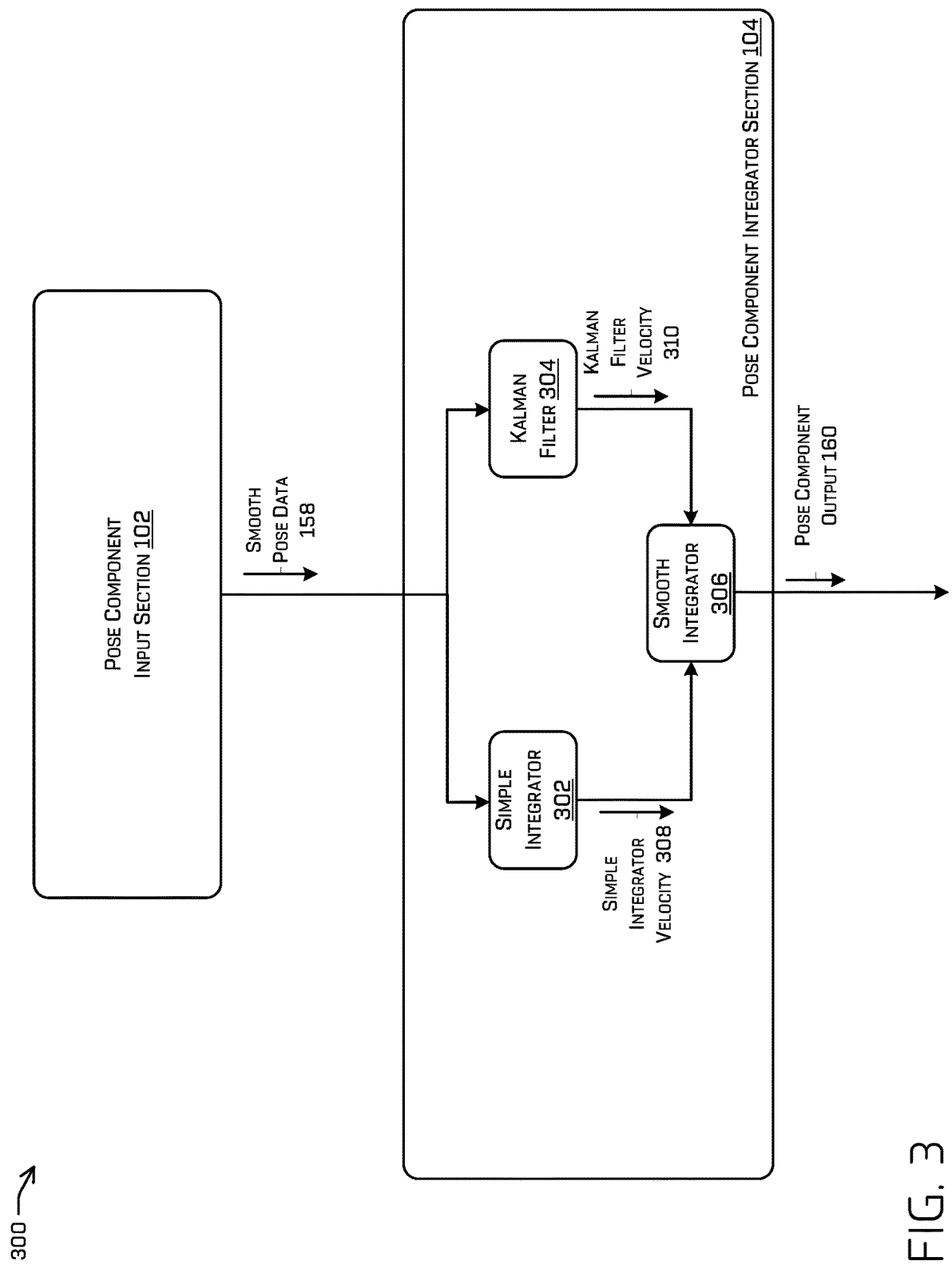

FIGS. 1-3 illustrate example views 100-300 of an architecture in which the techniques discussed herein may be implemented. In particular, the architecture includes a pose component (SPC) including a pose component input section 102 and a pose component integrator section 104. The architecture further includes a plurality of inertial measurement units (IMUs) 106 and an IMU subsystem 108. Items 102-108 may be implemented as one or more computing device(s) that include a processor(s) and memory. The memory may store instructions executable by the processor(s) to perform the functions of items 102-108. In addition or alternatively, items 102-108 may be implemented as one or more application-specific integrated circuits (ASICs). Further, though items 102-108 are depicted in FIG. 1 as residing in particular computing device(s), such a depiction is for illustrative purposes, as portions of the items may be in multiple computing devices, which may or may not be local. In general, items 102-108 may operate to output a smooth pose of, for example, an autonomous vehicle, that may be used in, for example, localization and navigation tasks of the autonomous vehicle. In some examples, items 102-108 may be subcomponents of a localization component of an autonomous vehicle.

The pose component input section 102 may include one or more signal monitors including a brake status monitor 110, a steering angle monitor 112, a wheel scale monitor 114, a wheel speed monitor 116, a global velocity monitor 118 and a roll-pitch monitor 120. Further, the pose component input section 102 may include a wheel speed correction component 122, a roll-pitch initializer component 124, a roll-pitch switch component 126, and a pose component input component 128.

In operation, the one or signal monitors 110-120 may monitor respective signals that may be received as input by the pose component input section 102 or that may be calculated based on signals received as input. In the illustrated example, the brake status monitor 110 may monitor a brake status signal 130, the steering angle monitor 112 may monitor a steering wheel angle signal 132, the wheel scale monitor 114 may monitor a wheel scale signal 134, the wheel speed monitor 116 may monitor a wheel speed signal 136, the global velocity monitor 118 may monitor a global velocity signal 138 and the roll-pitch monitor 120 may monitor a roll-pitch signal 140 determined by the roll-pitch switch 126 based at least on a roll-pitch data signal 142 as discussed below.

In some examples, the wheel scale signal 134, the global velocity signal 138, the roll-pitch data 142 along with the IMU biases 148 discussed below may be received from a global solver (not shown) of the vehicle including the pose component. The global solver may operate at a lower frequency relative to the pose component and may generate global data that may overlap with local data produced by the pose component. The global solver may produce the global data based on a wider variety of input information. The more frequent or smooth output of local pose data from the pose component may complement the global solvers less frequent global pose data. However, such as setup is merely an example and implementations are not so limited.

The one or signal monitors 110-120 may monitor the respective signals 130-140 for staleness, plausibility and/or other issues. In some examples, the signal monitors 110-120 may monitor the respective signals 130-140 to determine if the signals meet or exceed a threshold level of staleness or implausibility. The thresholds may differ for each signal and/or monitor. For example, the steering angle monitor 112 may monitor the steering angle signal 132 by determining whether a time since the most recent update to the steering angle signal 132 was received has exceeded a steering angle staleness threshold and by determining whether the steering angle represented by the steering angle signal 132 is within a plausible range of values and whether a change in the steering angle represented by the steering angle signal 132 exceeds a steering angle change plausibility threshold. As a non-limiting example of such, a vehicle state indicating wheels pointed 20 degrees to the right may form the base of a high implausibility that, after the next signal, that the wheels are pointed 20 degrees to the left. In an example, the steering change plausibility threshold may represent a maximum steering angle change rate of a vehicle including the pose component. As such, a change in steering angle 132 exceeding the maximum steering wheel change rate of the vehicle being monitored would likely represent corrupted data. The results of the monitoring by the signal monitors 110-120 may be provided to the pose component input component 128.

The wheel speed correction component 122 may receive the wheel scale signal 134 and wheel speed signal 136 and determine a scale corrected wheel speed 144. For example, as the vehicle including the pose component travels, various factors such as temperature, pressure and wear may cause the wheel scale represented by the signal 134 to vary. The wheel speed signal 136 may represent a linear speed at the wheels of the vehicle. In an example, the scale corrected wheel speed 144 may represent a linear speed that may account for differences in the wheel scale over time from a default wheel scale upon which the wheel speed signal is based.

The IMU subsystem 108 may receive a vehicle configuration signal 146, and IMU biases signal 148, IMU measurements 150 and the wheel speed signal 136. As discussed below with regard to FIG. 2, based on signals 136 and 146-150, the IMU subsystem 108 may output initializer data 152 to the roll-pitch initializer component 124 of the pose component input section 102 and bias corrected primary IMU measurements 154 to the pose component input component 128.

The roll-pitch initializer 124 may receive the initializer data 152 and generate roll-pitch initializer data 156. In some examples, the roll-pitch initializer data may represent an initial roll-pitch of the vehicle including the pose component prior to the full initialization of the vehicle. The roll-pitch switch 126 may receive the roll-pitch data 142 and the roll-pitch initializer data 156 and output the roll-pitch signal 140 to the pose component input component 128. For example, the roll-pitch switch 126 may output a roll-pitch signal 140 based on roll-pitch initializer data 156 prior to receiving roll-pitch data 142 (e.g., prior to initialization of a source of the roll-pitch data 142) and switch to generating the roll-pitch signal 140 based on the roll-pitch data 142 thereafter.

The pose component input component 128 may receive the signals 130, 132, 138, 140, 144 and 154 along with monitoring or status information output by the signal monitors 110-120. The pose component input component 128 may output smooth pose data 158 based on the received signals and information to the pose component integrator section 104. In some examples, the smooth pose data 158 may include the received signals and information.

As will be discussed in more detail with regard to FIG. 3, the pose component integrator section 104 may operate to generate a pose component output 160 based on the smooth pose data 158.

Turning to FIG. 2, the IMUs 106 may be inertial measurement units that include gyroscopes to measure and report angular rate and accelerometers to measure and report specific force. The IMUs 106 may include other components such as magnetometers to measure the magnetic field surrounding the system. The IMUs 106 may output respective IMU measurements 150 (e.g., sets of measurements from the components of each IMU) to the IMU subsystem 108. In some examples, the IMUs 106 may be included in a primary computing device and a secondary computing device. The IMU(s) of the secondary unit may operate in a similar manner to the IMUs of the primary computing device but the secondary unit may be more rugged (e.g., more resilient to shock, temperature and other environmental factors) and/or that may include additional self-diagnostic functionality. In some examples, the secondary unit may represent a computing device with an ASIL D rating. Throughout the disclosure, the secondary unit (or backup unit) may reference either the computational unit and/or an IMU associated with such a secondary unit.

The IMU subsystem 108 may include an IMU monitor 202, an IMU bias monitor 204, a stationary initializer component 206, a bias switch 208, an IMU data comparison component 210, an IMU health check component 212, a switch 214, an IMU failover component 216, and an IMU bias correction component 218.

In operation, the IMU monitor 202 may monitor the IMU measurements 150 output by the IMUs 106 for various factors such as the staleness and plausibility thresholds discussed above. In some examples, the staleness and plausibility thresholds may be pre-determined values that may be retrieved from a lookup table. The IMU measurements 150 may then be relayed to the IMU data comparison component 210 and the IMU health check component 212 along with the monitoring results.

The switch 214 may operate to initialize the IMU subsystem 108. For example, the switch 214 may output an initialization signal 220 to the stationary initializer 206 (e.g., upon initialization of a vehicle including the pose component) The stationary initializer 206 may receive the vehicle configuration signal 146 and the wheel speed signal 136 (e.g., from the wheel speed monitor 116) along with the initialization signal 220. The stationary initializer may output the initializer data 152 to the pose component input section 102 and output an initial bias signal 222 to the bias switch 208. In some examples, the stationary initializer 206 may produce the initializer data 152 and initial bias signal 222 before a global solver of the vehicle including the pose component is initialized.

The bias switch 208 may operate to output one of the initial biases 222 and IMU biases 148 to the IMU bias monitor 204. The IMU bias monitor may perform similar operations to the other monitor components 110-120 and 202 such as checking the received bias signal for staleness and/or plausibility. In some examples, the IMU biases 148 may be received from a global solver of the vehicle including the pose component.

The IMU data comparison component 210 may perform a consensus determination among the IMU measurements 150 of the plurality of IMUs 106 based at least in part on the initialized IMU biases 224. For example, where the system includes three IMUs, the IMU data comparison component 210 may apply the initialized IMU biases 224 to the IMU measurements 150 of the respective three IMUs 106. In examples in which the IMUs may be located separately on the vehicle, the IMU data comparison component 210 may also apply a transformation to the data of one or more of the IMUs such that the measurements have a common reference frame or origin. The IMU data comparison component 210 may then determine the differences between the bias corrected IMU measurements of the first and second IMUs, the first and third IMUs and the second and third IMUs. The IMU data comparison component 210 may then determine whether the bias corrected IMU measurements are within a threshold difference of one another. Where the IMU measurements 150 of one of the IMUs 106 deviates from the other IMU measurements by more than a threshold amount, the IMU data comparison component 210 may output an invalidate IMU signal 226 for the deviating IMU 106 to the IMU health check component 212. When two IMUs are valid or healthy prior to the IMU data comparison, the IMU data comparison component 210 may determine a mean of the IMU measurements 150 of the two remaining IMUs 106 and determine whether the values of the IMU measurements 150 deviate from the mean by more than a threshold amount. In some examples including a secondary (or backup) unit in addition to the plurality of IMUs 106, when less than two of the IMUs remain valid, the IMU data comparison component 210 may invalidate any remaining IMU such that the inertial measurements from the secondary unit are utilized by the pose component. Of course, the particular comparison operations discussed herein are exemplary and not limiting.

The IMU health check component 212 may receive the invalidate IMU signal 226, the initialized bias signal 224 and the IMU measurements 150. Based thereon, the IMU health check component 212 may operate to maintain the health or validity status of the IMUs 106 during operations based on the invalidate IMU signal 226. The IMU health check component 212 may output the health or validity status of the IMUs as IMU health data 228 to the switch 214 along with the initialized bias signal 224 and the IMU measurements 150. In some examples, the IMU health check component 212 may maintain the health or validity status of the IMUs 106 between initializations. In this way, the switch 214 may be provided with the IMU health data 228 after initialization. The switch 214 may further operate to provide the IMU health, biases and measurements data 230 to the IMU failover component 218.

The IMU failover component 216 may implement a failover logic to determine a primary IMU whose measurements may be provided to the pose component for use in determining the pose component output 160. Depending on the implementation, the failover logic may operate with a default priority order for IMUs with different IMUs 106 determined as the primary IMU for different combinations of healthy or valid IMUs 106. As mentioned above, in some examples including a secondary (or backup) compute unit in addition to the plurality of IMUs 106, when the IMUs 106 are all marked as invalid or unhealthy, the IMU failover 216 may determine the an IMU associated with the secondary (or backup) compute unit to be the primary IMU. Additional discussion of an example failover logic is provided with regard to the table 600 of FIG. 6.

Based on the outcome of the failover logic, the IMU failover component 216 may output the primary IMU measurements and IMU biases 232 to the IMU bias correction component 218. The IMU bias correction component 218 may receive the primary IMU measurements and IMU biases 232 and, based thereon, generate bias corrected primary IMU measurements 154. The IMU bias correction component 218 may then output the bias corrected primary IMU measurements 154 to the pose component input section 102.

Turning to FIG. 3, the pose component integrator section 104 may receive the smooth pose data 158 from the pose component input section 102. The pose component integrator section 104 may include a simple integrator component 302, a Kalman filter component 304 and a smooth integrator component 306. The simple integrator component 302 and Kalman filter component 304 may be configured to generate a location and/or velocity based on the smooth pose data 158. More particularly, the simple integrator component 302 may generate and output a simple integrator velocity 308 and the Kalman filter component 304 may generate and output a Kalman filter velocity 310. In some examples, the simple integrator component 302 may operate to receive wheel speed data to get a translational velocity and receives gyroscope data to get a rotational velocity. The simple integrator component 302 may be used to provide velocity estimate, which can be used to determine pose for executing safe-stop trajectory or no-go trajectory based on the translational velocity and rotations velocity. In addition, the simple integrator component 302 may be stateless (e.g., it does not need to be initialized to operate). In some examples, the Kalman filter component 304 may operate to perform a sensor fusion with noise models associated with wheel speed, accelerometers, gyroscopes, and a global velocity from global pose solver. The Kalman filter component 304 may utilize a probabilistic sensor fusion to estimate a velocity. In some examples, the Kalman filter component 304 may be more robust to error such as wheel slip.

Depending on the implementation, the components 302 and 304 may be selectively operated based on the status of the inputs to the pose component input section 102 and/or the status of the IMUS 106. As will be discussed below with regard to FIGS. 4 and 5, the simple integrator component 302 may utilize fewer inputs to determine the simple integrator velocity 308 in comparison to the inputs utilized by the Kalman filter component 304 to determine the Kalman filter velocity 310. As such, in some implementations, the pose component input component 128 or a component of the pose component integrator section 104 (not shown) may determine whether the velocity provided to the smooth integrator component 306 is to be provided by component 302 or component 304.

More particularly, in some examples, the Kalman filter component 304 may be utilized as a default to determine the velocity. In such an example, when signals from the global solver are not being received, have become stale, or are deemed likely corrupt for lack of plausibility, the pose component input component 128 may trigger a switchover to the simple integrator component 302 as the simple integrator component may have less reliance on global solver signals such as global velocity, wheel scale, roll-pitch, and so on. Similarly, the pose component input component 128 may trigger a switchover to the simple integrator component 302 in response to an indication that the IMUs are unhealthy with the exception of the IMU associated with the backup unit.

In a particular example, the simple integrator component 302 and the secondary unit may operate on separate physical hardware from the IMUs 106 and Kalman filter component 304. The physical hardware of the secondary unit and the simple integrator component 302 may have higher reliability, prior resilience to environmental conditions and/or self-diagnostic functionality. As such, the secondary unit and simple integrator component 302 may be utilized as backups for the IMUs 106 and Kalman filter component 304. In another example, the switching between the components 302 and 304 may be based on performance priorities. For example, the velocity determination may be switched to the simple integrator component 302 or to the Kalman filter component 304 to prioritize computational efficiency or estimation robustness, respectively.

The smooth integrator component 306 may receive one or more of the simple integrator velocity 308 and/or Kalman filter velocity 310 and determine the pose component output 160 based thereon. For example, by integrating a velocity of the vehicle including the pose component over time, the smooth integrator 306 may determine a smooth pose of the vehicle. For example, the velocity of the vehicle may be utilized to determine a updated location of the vehicle. Some examples may further include a constraint such as a complementary filter to further smooth the updates of the smooth pose. Such smooth pose data may improve localization and navigation functions without the need to increase the frequency of the global solver.

Figure 4:
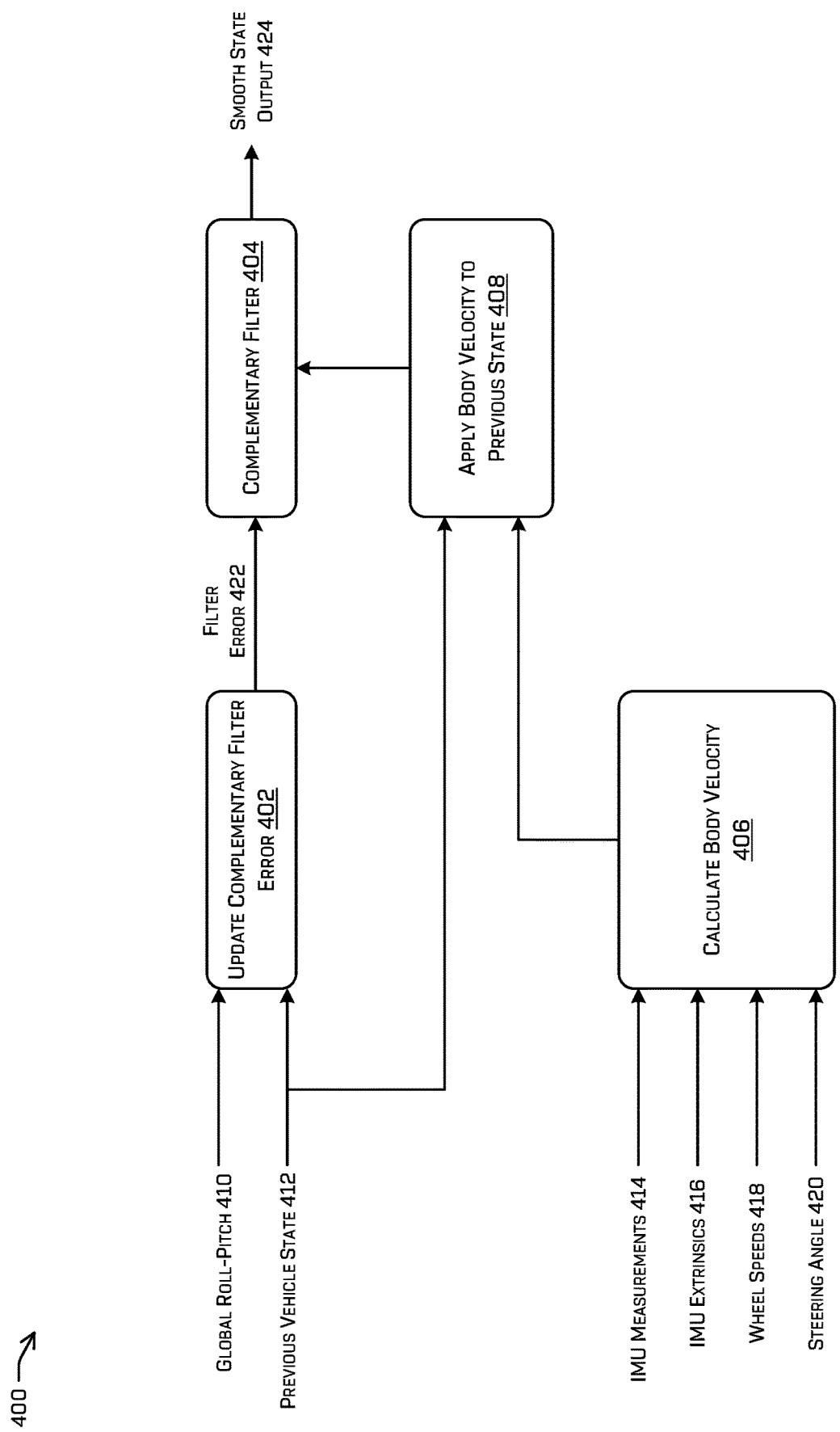
FIG. 4 is a block diagram of a data flow of an example simple integrator component and smooth integrator component for implementing the techniques described herein.

FIG. 4 is a block diagram of a data flow 400 of an example simple integrator component and smooth integrator component for implementing the techniques described herein, in accordance with examples of the disclosure. In some examples, the simple integrator component and smooth integrator component may include one or multiple features, components, and/or functionality of examples described herein with reference to FIG. 1. In some examples, the simple integrator component and smooth integrator component may be components of a pose component of a vehicle that may include a vehicle computing device, one or more sensor systems, one or more communication connections, and one or more drive systems.

In operation, the determination of the smooth state output based on simple integration includes operation 402-408.

At 402, a complementary filter error 422 is updated based on a global roll-pitch signal 410 and a previous vehicle state 412. The previous vehicle state 412 may include the last smooth state output of the pose component. At 406, a body velocity of the vehicle may be determined based on IMU measurements 414, IMU extrinsics 416 (e.g., information external to the IMU such as displacement of the IMU from the vehicle center), wheel speeds 418 of the vehicle and a steering angle 420 of the vehicle. Then, at 408, the body velocity determined at 406 may be applied to the previous vehicle state 412 to produce a pose. At 404, a complementary filter operation may determine the smooth state output 424 based on the output of 408 and the filter error 422. In effect, the complementary filter error update 402 and complementary filter operation 404 may constrain the deviation, for example, from the previous vehicle state and/or a global vehicle state. In some examples, the constraint of the complementary filter operation 404 may be relaxed as a function of the time since the last global roll-pitch or global velocity was received.

Figure 5:
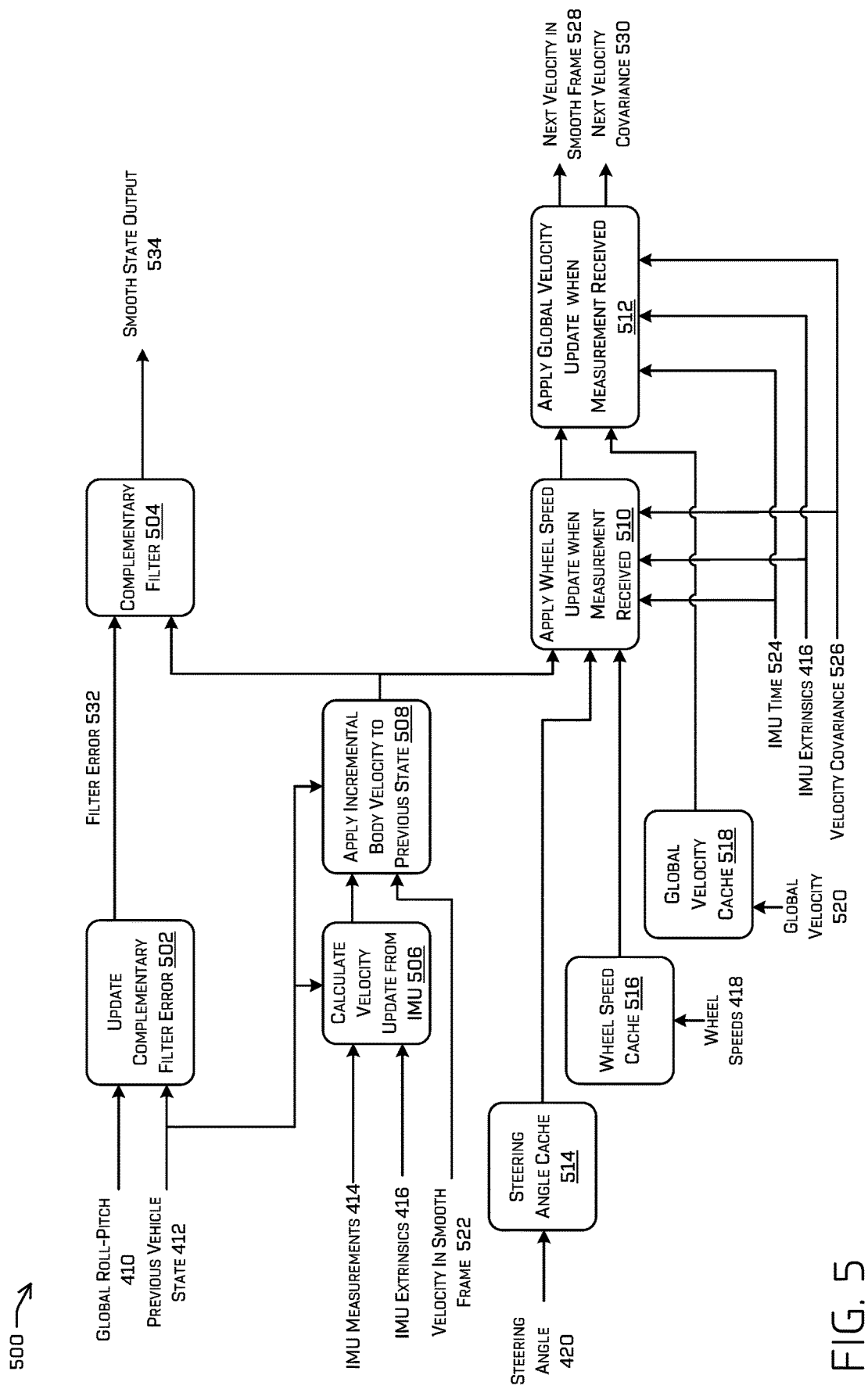
FIG. 5 is a block diagram of a data flow of an example Kalman filter component and smooth integrator component for implementing the techniques described herein.

FIG. 5 is a block diagram of a data flow 500 of an example Kalman filter component and smooth integrator component for implementing the techniques described herein, in accordance with examples of the disclosure. In some examples, the Kalman filter component and smooth integrator component may include one or multiple features, components, and/or functionality of examples described herein with reference to FIG. 1. In some examples, the Kalman filter component and smooth integrator component may be components of a pose component of a vehicle that may include a vehicle computing device, one or more sensor systems, one or more communication connections, and one or more drive systems.

In operation, the determination of the smooth state output based on simple integration includes operation 502-512. A steering angle cache 514 may cache a steering angle 420, a wheel speed cache 516 may cache wheel speeds 418 and a global velocity cache 518 may cache a global velocity 520.

At 502, a complementary filter error 532 is updated based on a global roll-pitch signal 410 and a previous vehicle state 412. The previous vehicle state 412 may include the last smooth state output of the pose component. At 506, a body velocity of the vehicle may be determined based on IMU measurements 414, IMU extrinsics 416 and the previous vehicle state 412. At 508, the body velocity determined at 506 and the velocity in the smooth frame 522 may be applied to the previous vehicle state 412. The complementary filter 504 may then determine the smooth state output 534 based on the output of 508 and the filter error 532.

Operations 510 and 512 may be triggered by updates to the caches 514-518. More particularly, when the steering angle cache 514 or wheel speeds cache 516 receive an update, operation 510 may be triggered to apply a wheel speed update based on the steering angle 420, wheel speeds 418, IMU time 524, IMU extrinsics 416, and a velocity covariance 526. Similarly, when the global velocity cache 518 receives an update, operation 512 may determine a next velocity in smooth frame 528 and a next velocity covariance 530 based on the global velocity 520, the output of 510, IMU time 524, IMU extrinsics 416, and a velocity covariance 526.

FIG. 6 illustrates an example table 600 that illustrates an example failover logic that may be utilized by the IMU failover component 216 to determine a primary IMU, in accordance with examples of the disclosure.

As illustrated, each row of the table 600 illustrates an aggregate health state of three IMUs (e.g., EMU-1, EMU-2, EMU-3), where H represents healthy and X represents unhealthy. Based on the health state of the IMUs, IMU failover component 216 may determine an active IMU to designate as the primary IMU (e.g., from fourth column) and an operations outcome for the vehicle (e.g., fifth column). In the illustrated example, a Go outcome represents a normal vehicle state, a secondary unit—NoGo represents a non-emergency stop procedure using the secondary unit data and secondary unit Response represents an emergency stop procedure. Of course, this table is merely illustrative and is not intended to be limiting on the failover logic of the IMU failover component.

Figure 7:
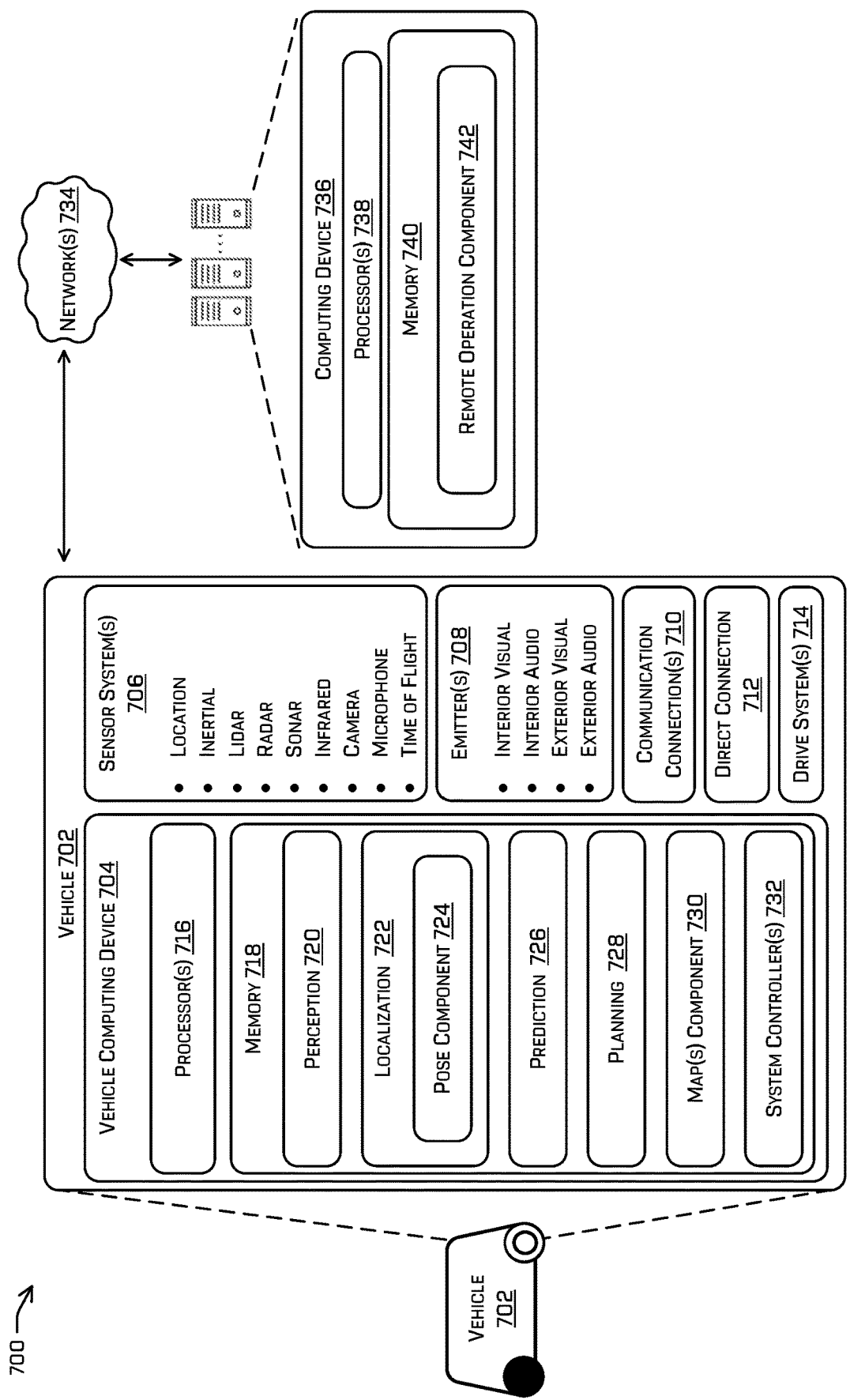
FIG. 7 depicts a block diagram of an example system for implementing the techniques described herein.

FIG. 7 depicts a block diagram of an example system 700 for implementing the techniques described herein. In at least one example, the system 700 can include a vehicle 702. In the illustrated example system 700, the vehicle 702 is an autonomous vehicle; however, the vehicle 702 can be any other type of vehicle. The vehicle 702 may be a vehicle that may include a pose component as discussed above with regard to FIGS. 1-6.

The vehicle 702 can be a driverless vehicle, such as an autonomous vehicle configured to operate according to a Level 7 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may not include a driver and/or controls for driving the vehicle 702, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 702 can include one or more computing device(s) 704, one or more sensor system(s) 706, one or more emitter(s) 708, one or more communication connection(s) 710 (also referred to as communication devices and/or modems), at least one direct connection 712 (e.g., for physically coupling with the vehicle 702 to exchange data and/or to provide power), and one or more drive system(s) 714. The one or more sensor system(s) 706 can be configured to capture sensor data associated with an environment.

The one or more sensor system(s) 706 can include time-of-flight sensors, location sensors (e.g., GPS, compass, etc.), inertial sensors (e.g., inertial measurement units (IMUs) 106, accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 706 can include multiple instances of each of these or other types of sensors. For instance, the time-of-flight sensors can include individual time-of-flight sensors located at the corners, front, back, sides, and/or top of the vehicle 702. As another example, the camera sensors can include multiple cameras disposed at various locations about the exterior and/or interior of the vehicle 702. The one or more sensor system(s) 706 can provide input to the computing device 704.

The vehicle 702 can also include one or more emitter(s) 708 for emitting light and/or sound. The one or more emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 702 can also include one or more communication connection(s) 710 that enable communication between the vehicle 702 and one or more other local or remote computing device(s) (e.g., a remote teleoperation computing device) or remote services. For instance, the one or more communication connection(s) 710 can facilitate communication with other local computing device(s) on the vehicle 702 and/or the one or more drive system(s) 714. Also, the one or more communication connection(s) 710 can allow the vehicle 702 to communicate with other nearby computing device(s) (e.g., other nearby vehicles, traffic signals, etc.).

The one or more communications connection(s) 710 can include physical and/or logical interfaces for connecting the computing device 704 to another computing device or one or more external networks 734 (e.g., the Internet). For example, the one or more communications connection(s) 710 can enable Wi-Fi®-based communication such as via frequencies defined by the IEEE 802.11 standards, short range wireless frequencies such as Bluetooth®, cellular communication (e.g., 2G®, 3G®, 4G®, 4G LTE®, 5G®, etc.), satellite communication, dedicated short-range communications (DSRC), or any suitable wired or wireless communications protocol that enables the respective computing device to interface with the other computing device(s).

In at least one example, the vehicle 702 can include one or more drive system(s) 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor system(s) 706 to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) 706 on the drive system(s) 714 can overlap or supplement corresponding systems of the vehicle 702 (e.g., sensor system(s) 706). The drive system(s) 714 may also include one or more steering motors, steering motor sensors, and steering racks.

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) 706 and to control operation of the various vehicle systems. In some examples, the drive system controller can include one or more processor(s) and memory communicatively coupled with the one or more processor(s). The memory can store one or more components to perform various functionalities of the drive system(s) 714. Furthermore, the drive system(s) 714 also include one or more communication connection(s) that enable communication by the respective drive system with one or more other local or remote computing device(s).

The computing device 704 can include one or more processor(s) 716 and memory 718 communicatively coupled with the one or more processor(s) 716. In the illustrated example, the memory 718 of the computing device 704 stores a perception component 720, a localization component 722 including a pose component 724—such as any of those discussed herein, a prediction component 726, a planning component 728, a maps component 730, and one or more system controller(s) 732. Though depicted as residing in the memory 718 for illustrative purposes, it is contemplated that the perception component 720, the localization component 722, the pose component 724, the prediction component 726, the planning component 728, the maps component 730, and the one or more system controller(s) 732 can additionally, or alternatively, be accessible to the computing device 704 (e.g., stored in a different component of vehicle 702) and/or be accessible to the vehicle 702 (e.g., stored remotely).

The perception component 720 can include functionality to perform object detection, segmentation, and/or classification. In some examples, the perception component 720 can provide processed sensor data that indicates a presence of an entity that is proximate to the vehicle 702 and/or a classification of the entity as an entity type (e.g., car, pedestrian, cyclist, building, tree, road surface, curb, sidewalk, unknown, etc.). In additional and/or alternative examples, the perception component 720 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In one example, the perception component 720 may detect a ground surface and determine a ride height based on sensor data.

Further, the perception component 720 can include functionality to store perception data generated by the perception component 720. In some instances, the perception component 720 can determine a track corresponding to an object that has been classified as an object type. For purposes of illustration only, the perception component 720, using sensor system(s) 706 can capture one or more images of an environment, which may be used to determine information about an environment.

The stored perception data can, in some examples, include fused perception data captured by the vehicle. Fused perception data can include a fusion or other combination of sensor data from sensor system(s) 706, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The localization component 722 can include functionality to receive data from the sensor system(s) 706 and/or other components to determine a position of the vehicle 702. For example, the localization component 722 can include and/or request/receive a three-dimensional map of an environment and can continuously determine a location of the autonomous vehicle within the map. In some instances, the localization component 722 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 722 can provide data to various components of the vehicle 702 to determine an initial position of an autonomous vehicle for generating a trajectory or for initial calibration. In examples of this disclosure, the localization component 722 may include the pose component that may determine a pose for the vehicle as discussed above.

The prediction component 726 can generate one or more probability maps representing prediction probabilities of possible locations of one or more objects in an environment. For example, the prediction component 726 can generate one or more probability maps for vehicles, pedestrians, animals, and the like within a threshold distance from the vehicle 702. In some instances, the prediction component 726 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 728 can determine a path for the vehicle 702 to follow to traverse through an environment. For example, the planning component 728 can determine various routes and paths and various levels of detail. In some instances, the planning component 728 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 728 can generate an instruction for guiding the autonomous vehicle along at least a portion of the route from the first location to the second location. In at least one example, the planning component 728 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 728 can alternatively, or additionally, use data from the perception component 720 and/or the prediction component 726 to determine a path for the vehicle 702 to follow to traverse through an environment. For example, the planning component 728 can receive data from the perception component 720 and/or the prediction component 726 regarding objects associated with an environment. Using this data, the planning component 728 can determine a route to travel from a first location (e.g., a current location) to a second location (e.g., a target location) to avoid objects in an environment. In at least some examples, such a planning component 728 may determine there is no such collision free path and, in turn, provide a path which brings vehicle 702 to a safe stop avoiding all collisions and/or otherwise mitigating damage.

The memory 718 can further include a maps component 730 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 730 can include at least one map (e.g., images and/or a mesh). In some examples, the vehicle 702 can be controlled based at least in part on the map(s) component 730. That is, the map(s) component 730 can be used in connection with the perception component 720 (and sub-components), the localization component 722 (and sub-components), the prediction component 726, and/or the planning component 728 to determine a location of the vehicle 702, identify objects in an environment, generate prediction probabilit(ies) associated with objects and/or the vehicle 702, and/or generate routes and/or trajectories to navigate within an environment.

In at least one example, the computing device 704 can include one or more system controller(s) 732, which can be configured to control steering, propulsion, braking, safety, emitters, communication, and other systems of the vehicle 702. These system controller(s) 732 can communicate with and/or control corresponding systems of the drive system(s) 714 and/or other components of the vehicle 702, which may be configured to operate in accordance with a path provided from the planning component 728.

The vehicle 702 can connect to computing device(s) 736 via network 734 and can include one or more processor(s) 738 and memory 740 communicatively coupled with the one or more processor(s) 738. In at least one instance, the one or more processor(s) 738 can be similar to the processor(s) 716 and the memory 740 can be similar to the memory 718. In the illustrated example, the memory 740 of the computing device(s) 736 stores a remote operation component 742. Though depicted as residing in the memory 740 for illustrative purposes, it is contemplated that the remote operation component 742 can additionally, or alternatively, be accessible to the computing device(s) 736 (e.g., stored in a different component of computing device(s) 736 and/or be accessible to the computing device(s) 736 (e.g., stored remotely).

The remote operation component 742 can include functionality to receive an indication of the health status of the IMUs (e.g., IMUs 106), monitored signals that are outside thresholds, wheel-slip events, vehicle-skid events, steering-component slippage, and/or a request for preventative maintenance (e.g., based on a number of unhealthy or invalidated IMUs). In some examples, the remote operation component 742 can schedule a maintenance operation based on a number of unhealthy or invalidated IMUs or a determination by the vehicle 702 that a number of unhealthy or invalidated IMUs or the status of monitored signals is indicative of a degraded state. In some examples, a remote operation component 742 can include teleoperators or operators who can control the vehicle 702 or can provide instructions to the vehicle based on a IMU invalidation event.

The processor(s) 716 of the computing device 704 and the processor(s) 738 of the computing device(s) 736 can be any suitable processor capable of executing instructions to process data and perform operations as described herein. By way of example and not limitation, the processor(s) 716 and 738 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 718 of the computing device 704 and the memory 740 of the computing device(s) 736 are examples of non-transitory computer-readable media. The memory 718 and 740 can store an operating system and one or more software applications, instructions, programs, and/or data to implement the methods described herein and the functions attributed to the various systems. In various implementations, the memory 718 and 740 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 718 and 740 can be implemented as a neural network. In some examples, a machine learned model could be trained to determine whether monitored input signal statuses indicate a failure in the vehicle or other condition of the vehicle based on sensor data received from the IMUS, yaw rate sensor, encoder, steering sensor, etc.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

As can be understood, the components discussed herein are described as divided for illustrative purposes. However, the operations performed by the various components can be combined or performed in any other component.

It should be noted that while FIG. 7 is illustrated as a distributed system, in alternative examples, components of the vehicle 702 can be associated with the computing device(s) 736 and/or components of the computing device(s) 736 can be associated with the vehicle 702. That is, the vehicle 702 can perform one or more of the functions associated with the computing device(s) 736, and vice versa.

Figure 8:
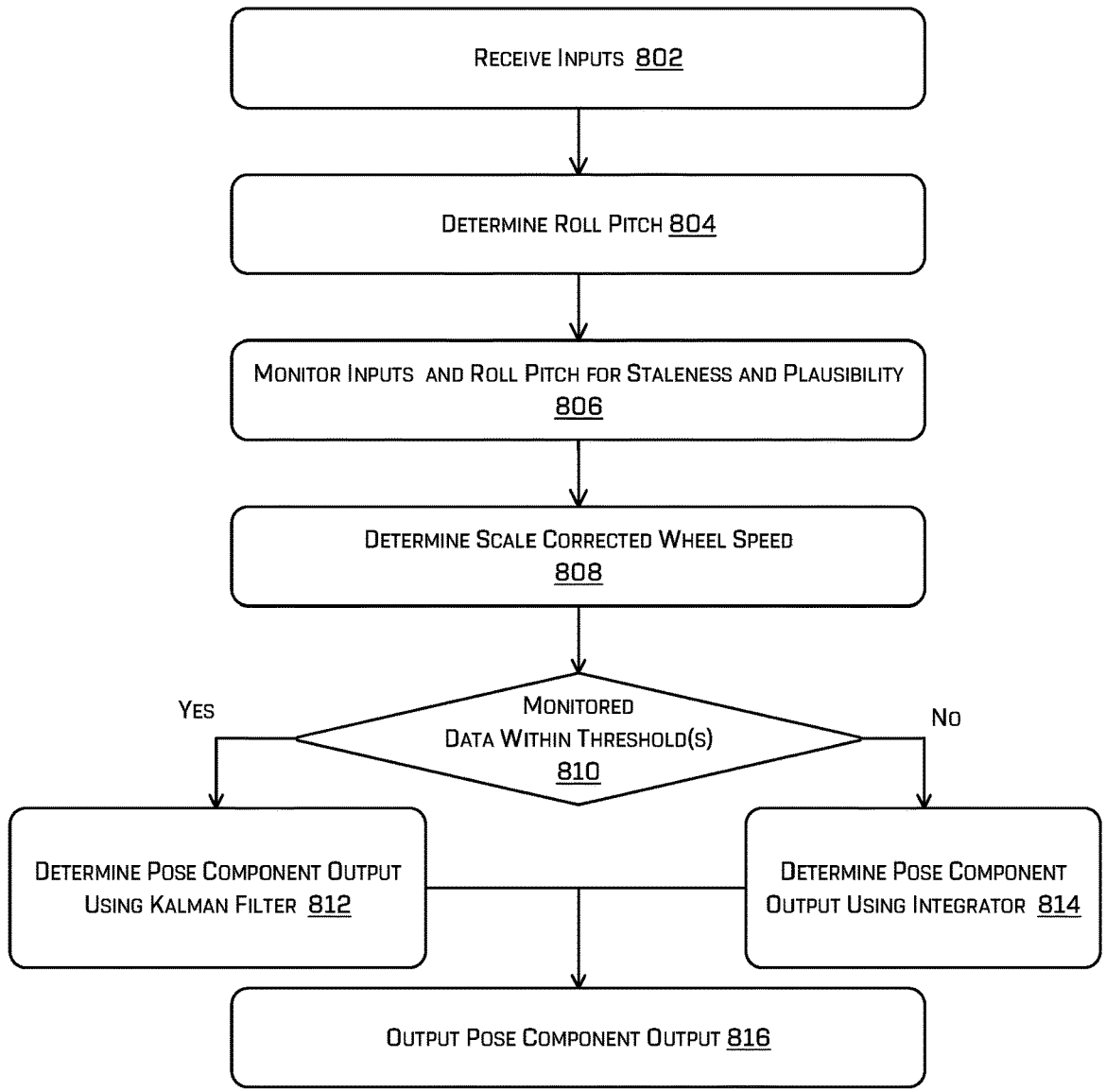
FIG. 8 illustrates an example process for determining a smooth pose in accordance with this disclosure.

FIG. 8 illustrates an example process 800 for determining a smooth pose in accordance with this disclosure. More particularly, process 800 may relate to monitoring inputs received by the pose component for staleness and plausibility and generating a smooth pose based at least in part on the monitoring (e.g., by switching the generation method or determination type based on the monitored status of the inputs). This process 800 is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The process 800 can be performed by any component, the vehicle computing device 704 of FIG. 7, another processing unit or computing device, etc. For ease of discussion, the process 800 will be discussed in the context of FIG. 1.

In FIG. 8, at 802, the pose component may receive input signals. As discussed above regarding FIG. 1, the input signals may include a brake status signal 130, a steering wheel angle signal 132, a wheel scale signal 134, a wheel speed signal 136, a global velocity signal 138 and a roll-pitch data signal 142, and bias corrected primary IMU measurements 154. At 804, the pose component may calculate a roll-pitch based on the roll-pitch data signal 142.

At 806, the pose component may monitor the inputs and the roll-pitch for staleness and plausibility. As discussed above, the monitoring may utilize thresholds that correspond to the different inputs and monitored data. Next, at 808, the pose component may calculate a scale correction wheel speed based on the wheel speed signal 136 and the wheel scale signal 134.

At 810, the pose component may determine whether the monitored signals and data were within the respective thresholds. If the monitored signals and data were within the respective thresholds, the process may continue to 812. Otherwise, the process may continue to 814.

At 812, the pose component may calculate a pose component output using a Kalman filter. As discussed above, determining the pose component output using a Kalman filter may be based on at least one global input (e.g., the global velocity, the wheel scale, and the roll-pitch data) which may be received from a global solver that operates at a lower frequency relative to the pose component. Alternatively, at 814, the pose component may calculate the pose component output using an integrator. As discussed above, determining the pose component output using the integrator may be based on fewer inputs relative to the Kalman filter, may be more resilient to input disruption, but may produce less precise or robust pose component outputs. In addition, as discussed above, the determination of the pose component output in 812 and in 814 may be based on bias corrected primary IMU measurements.

Next, at 816, the pose component may output the pose component output. For example, the pose component may output the pose component output to another component of a localization component, a planning component, a prediction component or so on for use in operating the vehicle including the pose component. For example, the pose component output may be provided to the planning component to allow for planning based on the current state of the vehicle represented by the pose output component.

Figure 9:
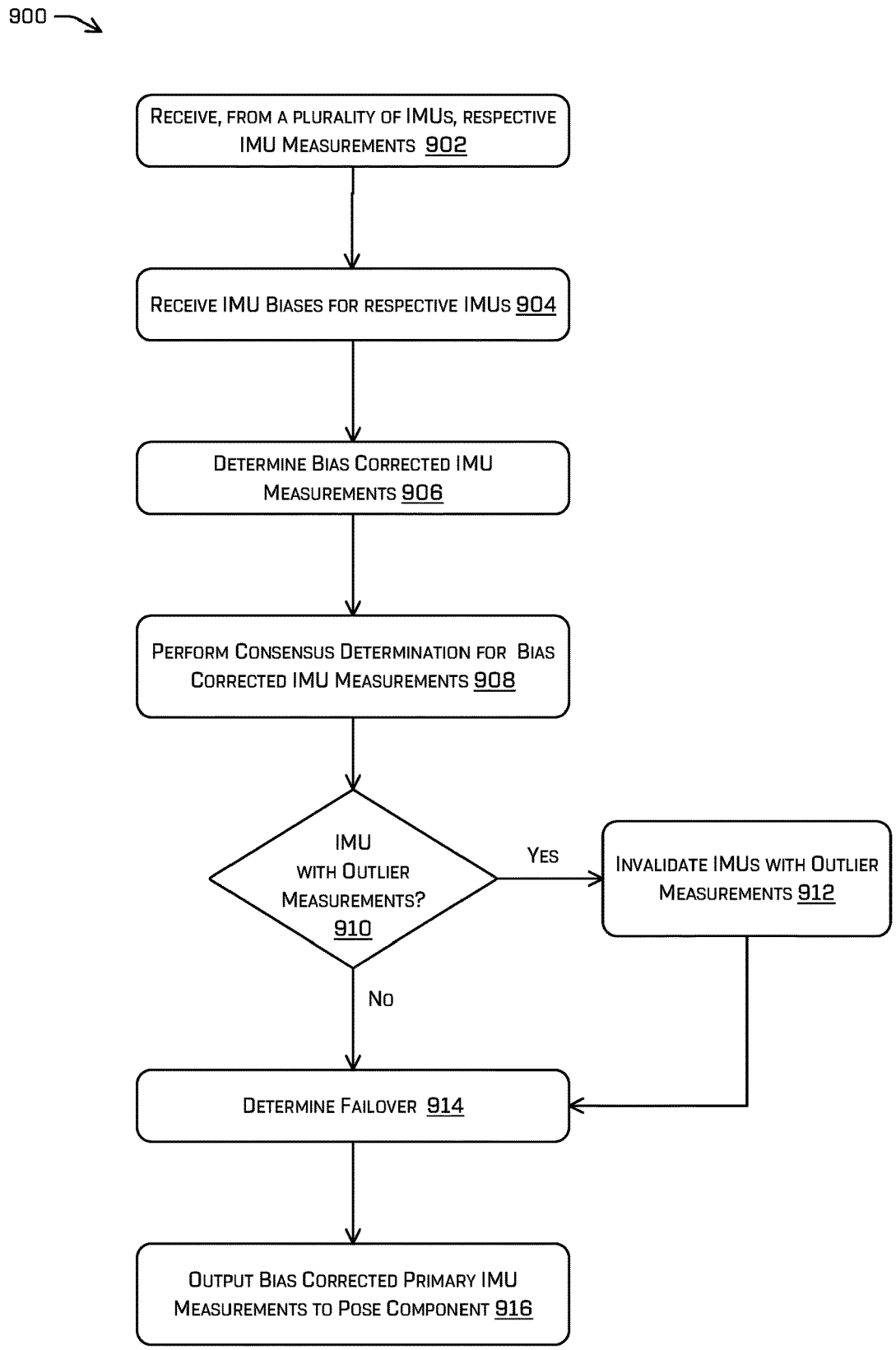
FIG. 9 illustrates an example process for determining bias corrected primary IMU measurements for a pose component in accordance with this disclosure.

FIG. 9 illustrates an example process 900 for determining bias corrected primary IMU measurements for a pose component. More particular, process 900 may provide for an IMU subsystem that may receive IMU measurements from a plurality of IMUs, detect failing IMUs and determine a primary IMU whose measurements are to be used for smooth pose generation. The process 900 can be performed by any component, such as the vehicle computing device 704 of FIG. 7, another processing unit or computing device, etc. For ease of discussion, the process 900 will be discussed in the context of FIG. 1.

In particular, at 902, the IMU subsystem may receive, from a plurality of IMUs, respective IMU measurements. At 904, the IMU subsystem may receive, for the plurality of IMUs, respective IMU biases. For example, the IMU biases may be received from a global solver of a localization component that may operate at a lower frequency band a pose component. At 906, the IMU subsystem may determine, for the plurality of IMUs, bias corrected IMU measurements based on the respective IMU measurements and respective IMU biases.

At 908, the IMU subsystem may perform a consensus determination for the bias corrected IMU measurements. Then, at 910, the IMU subsystem may determine whether any IMUs had outlier measurements. If so, the process may continue to 912. Otherwise, the process may continue to 914. At 912, the IMU subsystem may invalidate IMUs that have outlier measurements. In some implementations, the invalidation of an IMU may be maintained until the vehicle including the IMU is serviced and the IMU is diagnosed and repaired or replaced.

An example of operations 906-912 in a system that includes three IMUs follows. In operation, the IMU subsystem may apply the IMU biases to the IMU measurements of the respective three IMUs. The IMU subsystem may then determine the differences between the bias corrected IMU measurements of the first and second IMUs, the first and third IMUs and the second and third IMUs. The IMU subsystem may then determine whether the bias corrected IMU measurements are within a threshold difference of one another. Where the bias corrected IMU measurements of one of the IMUs deviates from the other bias corrected IMU measurements by more than a threshold amount, the IMU subsystem may invalidate the deviating IMU or otherwise label the deviating IMU as unhealthy. When two IMUs are valid or healthy prior to the IMU data comparison, the IMU subsystem may determine a mean of the IMU measurements of the two remaining IMUs and determine whether the values of the IMU measurements deviate from a mean more than a threshold amount. If so, the IMU subsystem may invalidate both IMUs or otherwise label the IMUs as unhealthy. In some examples including an IMU associated with a secondary (or backup) compute unit in addition to the plurality of IMUs, when less than two IMUs remains valid, the IMU subsystem may invalidate any remaining IMU such that the inertial measurements from the IMU associated with the secondary (or backup) compute unit are utilized by the pose component. Of course, the particular comparison operations discussed herein are exemplary and not limiting.

At 914, the IMU subsystem may perform a failover logic to determine a primary IMU of the remaining valid IMUs. As discussed above with respect to FIGS. 2 and 6, the failover logic may operate with a default priority order for IMUs with different IMUs determined as the primary IMU for different combinations of healthy or valid IMUs. As mentioned above, in some examples including a secondary (or backup) unit in addition to the plurality of IMUs, when the IMUs are all marked as invalid or unhealthy, the failover logic may determine the secondary unit to be the primary IMU. In some implementations, in addition to determining the primary IMU, the failover logic may also determine a service state of a vehicle including the IMU subsystem. For example, depending on the number of invalid or unhealthy IMUs, the failover logic may trigger the vehicle to enter a nonemergency stop routine or an emergency stop routine (e.g., depending on whether the failover logic determines a likelihood of dangerous system failure or instability as the cause of the IMU failures).

Next, at 916, the IMU subsystem may output the bias corrected IMU measurements of the primary IMU to a pose component for use in generating a smooth pose.

Example Clauses

Clause A. A method comprising: receiving, from a plurality of IMUs associated with a vehicle, a plurality of respective IMU measurements; performing a consensus determination for the plurality of respective IMU measurements; determining, based at least in part on the consensus determination for the plurality of respective IMU measurements, a primary IMU of the plurality of IMUs; receiving a plurality of input signals; determining, as a monitoring signal, whether a signal from the plurality of input signals is one or more of stale or implausible; determining, as a state update algorithm and based at least in part on the monitoring signal and the consensus determination, one or more of an integration or a Kalman filter; determining a vehicle state based at least in part on the plurality of input signals, a subset of IMU measurements associated with the primary IMU, and the state update algorithm; and controlling the vehicle based at least in part on the vehicle state.

Clause B. The method of clause A, further comprising: determining that a particular IMU of the plurality of IMUs is in a failure state based on the consensus determination for the plurality of respective IMU measurements; and based at least in part on the determining the particular IMU is in the failure state, setting the particular IMU of the plurality of IMUs to an invalid status, wherein the determining the primary IMU of the plurality of IMUs does not determine the particular IMU to be the primary IMU based at least in part on the invalid status.

Clause C. The method of clause A, further comprising: receiving, for the plurality of IMUs, a plurality of respective IMU biases; and determining, based on the plurality of respective IMU measurements and the plurality of respective IMU biases, respective bias corrected IMU measurements, wherein at least the performing the consensus determination and the determining the vehicle state are based on the respective bias corrected IMU measurements of the primary IMU.

Clause D. The method of clause C, wherein performing the consensus determination comprises determining, based on the respective bias corrected IMU measurements, average bias corrected IMU measurements.

Clause E. The method of clause A, wherein the plurality of input signals comprise one or more of: wheel encoder data; wheel scale data; a velocity input determined by another system associated with the vehicle; or a steering angle.

Clause F. The method of clause A, wherein: the determining the signal is stale comprises determining that a time associated with the signal meets or exceeds a threshold time, and the determining the signal is implausible comprises determining an amount of divergence from a physical constraint associated with the signal.

Clause G. One or more non-transitory computer-readable media storing instructions executable by one or more processors that, when executed, cause the one or more processors to perform acts comprising: receiving, from a plurality of IMUs associated with a vehicle, a plurality of respective IMU measurements; performing a consensus determination for the plurality of respective IMU measurements; determining, based at least in part on the consensus determination for the plurality of respective IMU measurements, a primary IMU of the plurality of IMUs; and determining a vehicle state based at least in part on a plurality of input signals and a subset of IMU measurements associated with the primary IMU.

Clause H. The one or more non-transitory computer-readable media of clause G, wherein the acts further comprise: determining a particular IMU of the plurality of IMUs is in a failure state based on the consensus determination for the plurality of respective IMU measurements; and based at least in part on the determining the particular IMU is in the failure state, setting the particular IMU of the plurality of IMUs to an invalid status, wherein the determining the primary IMU of the plurality of IMUs does not determine the particular IMU to be the primary IMU based at least in part on the invalid status.

Clause I. The one or more non-transitory computer-readable media of clause G, wherein the acts further comprise: receiving, for the plurality of IMUs, a plurality of respective IMU biases; and determining, based on the plurality of respective IMU measurements and the plurality of respective IMU biases, respective bias corrected IMU measurements, wherein at least the performing the consensus determination and the determining the vehicle state are based on the respective bias corrected IMU measurements.

Clause J. The one or more non-transitory computer-readable media of clause I, wherein performing the consensus determination comprises determining, based on the respective bias corrected IMU measurements, average bias corrected IMU measurements.

Clause K. The one or more non-transitory computer-readable media of clause G, wherein the plurality of input signals comprise one or more of: wheel encoder data; wheel scale data; a velocity input determined by another system associated with the vehicle; or a steering angle.

Clause L. The one or more non-transitory computer-readable media of clause G, further comprising: receiving a plurality of input signals at a pose component; determining, as a monitoring signal, whether a signal from the plurality of input signals is one or more of stale or implausible; determining, based at least in part on the monitoring signal and the consensus determination, a determined state update algorithm of a plurality of state update algorithms for determining the vehicle state; and wherein the determining the vehicle state based on the plurality of input signals and the subset of IMU measurements corresponding to the primary IMU is performed using the determined state update algorithm of the plurality of state update algorithms for determining the vehicle state.

Clause M. The one or more non-transitory computer-readable media of clause K, wherein: the determining the signal is stale comprises determining that a time associated with the signal meets or exceeds a threshold time, and the determining the signal is implausible comprises determining an amount of divergence from a physical constraint associated with the signal.

Clause N. A system comprising: one or more processors; and one or more non-transitory computer-readable media storing instructions executable by the one or more processors, wherein the instructions, when executed, cause the one or more processors to perform acts comprising: receiving a plurality of input signals; determining, as a monitoring signal, whether a signal from the plurality of input signals is one or more of stale or implausible; determining, based at least in part on the monitoring signal, a determined pose update algorithm of a plurality of pose update algorithms for determining a pose of the vehicle; determining a pose of the vehicle based at least in part on the plurality of input signals, IMU measurements associated with a primary IMU and the determined pose update algorithm; and controlling the vehicle based at least in part on the pose.

Clause O. The system of clause N, wherein: the determining the signal is stale comprises determining that a time associated with the signal meets or exceeds a threshold time, and the determining the signal is implausible comprises determining an amount of divergence from a physical constraint associated with the signal.

Clause P. The system of clause N, wherein the plurality of input signals comprise one or more of: wheel encoder data; wheel scale data; a velocity input determined by another system associated with the vehicle; or a steering angle.

Clause Q. The system of clause N, wherein the acts further comprise: receiving, at the pose component and from a plurality of IMUs including the primary IMU, a plurality of respective IMU measurements; performing a consensus determination for the plurality of respective IMU measurements; and determining, based at least in part on the consensus determination for the plurality of respective IMU measurements, the primary IMU of the plurality of IMUs.

Clause R. The system of clause Q, wherein the acts further comprise: determining a particular IMU of the plurality of IMUs is in a failure state based on the consensus determination for the plurality of respective IMU measurements; and based at least in part on the determining the particular IMU is in the failure state, setting the particular IMU of the plurality of IMUs to an invalid status, wherein the determining the primary IMU of the plurality of IMUs does not determine the particular IMU to be the primary IMU based at least in part on the invalid status.

Clause S. The system of clause Q, wherein the acts further comprise: receiving, for the plurality of IMUs, a plurality of respective IMU biases; and determining, based on the plurality of respective IMU measurements and the plurality of respective IMU biases, respective bias corrected IMU measurements, and wherein at least the performing the consensus determination and the determining the smooth pose are based on the respective bias corrected IMU measurements.

Clause T. The system of clause S, wherein performing the consensus determination comprises determining, based on the respective bias corrected IMU measurements, average bias corrected IMU measurements.

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving, from a plurality of IMUs associated with a vehicle, IMU measurements;
performing a consensus determination for the IMU measurements, wherein performing the consensus determination comprises determining whether the IMU measurements are within a threshold difference of one another;
determining, based at least in part on the consensus determination, a primary IMU of the plurality of IMUs, the primary IMU configured to generate primary IMU measurements utilized to generate pose data by a single pose system comprising the plurality of IMUs, wherein the primary IMU measurements are independent of the pose data generated by the single pose system;
receiving a plurality of input signals from one or more additional sensors at the single pose system configured to generate the pose data;
determining, as a monitoring signal, whether a signal from the IMU measurements is one or more of stale or implausible;
determining that at least one IMU of the plurality of IMUs is invalid based at least in part on determining that the at least one IMU of the plurality of IMUs is generating outlier IMU measurements, stale IMU measurements, or implausible IMU measurements;
determining a subset of the plurality of IMUs based at least in part on the primary IMU and the monitoring signal;
determining, as a state update algorithm and based at least in part on the monitoring signal, the consensus determination, and a number of invalid IMUs, one of an integration or a Kalman filter configured to receive the IMU measurements, wherein a first computing device is configured to execute the integration and a second computing device is configured to execute the Kalman filter, wherein the integration is configured to receive a first number of inputs and the Kalman filter configured to receive a second number of inputs greater than the first number of inputs;

determining a vehicle state based at least in part on the plurality of input signals, the IMU measurements associated with the subset of the plurality of IMUs, the number of invalid IMUs, and the state update algorithm, wherein the vehicle state comprises one of:
  (i) a normal vehicle state, wherein determining the normal vehicle state is based at least in part on determining a first number of IMUs are invalid,
  (ii) a non-emergency vehicle state, wherein determining the non-emergency vehicle state is based at least in part on determining a second number of IMUs are invalid, or
  (iii) an emergency vehicle state, wherein determining the emergency vehicle state is based at least in part on determining a third number of IMUs are invalid; and controlling the vehicle based at least in part on the vehicle state.

2. The method of claim 1, further comprising:
determining that a particular IMU of the plurality of IMUs is in a failure state based on the consensus determination for the IMU measurements; and
based at least in part on the determining the particular IMU is in the failure state, setting the particular IMU of the plurality of IMUs to an invalid status,
wherein the determining the primary IMU of the plurality of IMUs does not determine the particular IMU to be the primary IMU based at least in part on the invalid status.

3. The method of claim 1, wherein performing the consensus determination comprises determining, based on the IMU measurements, average IMU measurements.

4. The method of claim 1, wherein the plurality of input signals comprise one or more of:
wheel encoder data;
wheel scale data;
a velocity input determined by another system associated with the vehicle; or
a steering angle.

5. The method of claim 1, wherein:
the determining the signal is stale comprises determining that a time associated with the signal meets or exceeds a threshold time, and
the determining the signal is implausible comprises determining an amount of divergence from a physical constraint associated with the signal.

6. The method of claim 1, wherein the plurality of IMUs associated with the vehicle comprise a first IMU located at a first location of the vehicle and a second IMU located at a second location of the vehicle, the method further comprising:
receiving a first IMU measurement from the first IMU and a second IMU measurement from the second IMU; and
modifying the first IMU measurement such that the first IMU measurement and the second IMU measurement have a common reference frame.

7. The method of claim 1, further comprising:
determining a velocity of the vehicle based at least in part on the IMU measurements, IMU extrinsic data, wheel speeds of the vehicle, and a steering angle of the vehicle; and
determining, by applying the velocity to the vehicle state, the pose data of the vehicle.

8. One or more non-transitory computer-readable media storing instructions executable by one or more processors that, when executed, cause the one or more processors to perform acts comprising:
receiving, from a plurality of IMUs associated with a vehicle, IMU measurements;
performing a consensus determination for the IMU measurements, wherein performing the consensus determination comprises determining whether the IMU measurements are within a threshold difference of one another;
determining, based at least in part on the consensus determination, a primary IMU of the plurality of IMUs, the primary IMU configured to generate primary IMU measurements utilized to generate pose data by a single pose system comprising the plurality of IMUs, wherein the primary IMU measurements are independent of the pose data generated by the single pose system;
receiving a plurality of input signals from one or more additional sensors at the single pose system configured to generate the pose data;
determining, as a monitoring signal, whether a signal from the IMU measurements is one of stale or implausible;
determining that at least one IMU of the plurality of IMUs is invalid based at least in part on determining that the at least one IMU of the plurality of IMUs is generating outlier IMU measurements or is stale or implausible;
determining a subset of the plurality of IMUs based at least in part on the primary IMU and the monitoring signal;
determining, as a state update algorithm and based at least in part on the consensus determination and a number of invalid IMUs, one of an integration or a Kalman filter configured to receive the IMU measurements, wherein a first computing device is configured to execute the integration and a second computing device is configured to execute the Kalman filter, wherein determining the state update algorithm comprises:
determining the Kalman filter as the state update algorithm; and
switching to the integration as the state update algorithm based at least in part on the number of invalid IMUs;
determining a vehicle state based at least in part on the plurality of input signals, the IMU measurements associated with the subset of the plurality of IMUs, the number of invalid IMUs, and the state update algorithm, wherein the vehicle state comprises one of:
  (i) a normal vehicle state, wherein determining the normal vehicle state is based at least in part on determining a first number of IMUs are invalid,
  (ii) a non-emergency vehicle state, wherein determining the non-emergency vehicle state is based at least in part on determining a second number of IMUs are invalid, or
  (iii) an emergency vehicle state, wherein determining the emergency vehicle state is based at least in part on determining a third number of IMUs are invalid; and controlling the vehicle based at least in part on the vehicle state.

9. The one or more non-transitory computer-readable media of claim 8, wherein the acts further comprise:
determining a particular IMU of the plurality of IMUs is in a failure state based on the consensus determination for the IMU measurements; and based at least in part on the determining the particular IMU is in the failure state, setting the particular IMU of the plurality of IMUs to an invalid status, wherein the determining the primary IMU of the plurality of IMUs does not determine the particular IMU to be the primary IMU based at least in part on the invalid status.

10. The one or more non-transitory computer-readable media of claim 8, wherein performing the consensus determination comprises determining, based on the IMU measurements, average IMU measurements.

11. The one or more non-transitory computer-readable media of claim 8, wherein the plurality of input signals comprise one or more of:
wheel encoder data;
wheel scale data;
a velocity input determined by another system associated with the vehicle; or
a steering angle.

12. The one or more non-transitory computer-readable media of claim 8, the acts further comprising, wherein determining the state update algorithm is further based on the monitoring signal.

13. The one or more non-transitory computer-readable media of claim 12, wherein:
the determining the signal is stale comprises determining that a time associated with the signal meets or exceeds a threshold time, and
the determining the signal is implausible comprises determining an amount of divergence from a physical constraint associated with the signal.

14. A system comprising:
one or more processors; and
one or more non-transitory computer-readable media storing instructions executable by the one or more processors, wherein the instructions, when executed, cause the one or more processors to perform acts comprising:
receiving, from a plurality of IMUs associated with a vehicle, IMU measurements;
performing a consensus determination for the IMU measurements, wherein performing the consensus determination comprises determining whether the IMU measurements are within a threshold difference of one another;
determining, based at least in part on the consensus determination, a primary IMU of the plurality of IMUs, the primary IMU configured to generate primary IMU measurements utilized to generate pose data by a single pose system comprising the plurality of IMUs, wherein the primary IMU measurements are independent of the pose data generated by the single pose system;
receiving a plurality of input signals from one or more additional sensors at the single pose system configured to generate the pose data;
determining, as a monitoring signal, whether a signal from the IMU measurements is one or more of stale or implausible;
determining that at least one IMU of the plurality of IMUs is invalid based at least in part on determining that the at least one IMU of the plurality of IMUs is generating outlier IMU measurements or is stale or implausible;
determining a subset of the plurality of IMUs based at least in part on the primary IMU and the monitoring signal;
determining, as a state update algorithm and based at least in part on the monitoring signal, the consensus determination, and a number of invalid IMUs, one of an integration or a Kalman filter configured to receive the IMU measurements, wherein a first computing device is configured to execute the integration and a second computing device is configured to execute the Kalman filter, wherein determining the state update algorithm comprises:
determining the Kalman filter as the state update algorithm; and
switching to the integration as the state update algorithm based at least in part on the number of invalid IMUs;
determining a vehicle state based at least in part on the plurality of input signals, the IMU measurements associated with the subset of the plurality of IMUs, the number of invalid IMUs, and the state update algorithm, wherein the vehicle state comprises one of:
(i) a normal vehicle state, wherein determining the normal vehicle state is based at least in part on determining a first number of IMUs are invalid,
(ii) a non-emergency vehicle state, wherein determining the non-emergency vehicle state is based at least in part on determining a second number of IMUs are invalid, or
(iii) an emergency vehicle state, wherein determining the emergency vehicle state is based at least in part on determining a third number of IMUs are invalid;
and controlling the vehicle based at least in part on the vehicle state.

15. The system of claim 14, wherein:
the determining the signal is stale comprises determining that a time associated with the signal meets or exceeds a threshold time, and
the determining the signal is implausible comprises determining an amount of divergence from a physical constraint associated with the signal.

16. The system of claim 14, wherein the plurality of input signals comprise one or more of:
wheel encoder data;
wheel scale data;
a velocity input determined by another system associated with the vehicle; or
a steering angle.

17. The system of claim 14, wherein the acts further comprise:
determining a particular IMU of the plurality of IMUs is in a failure state based on the consensus determination for the IMU measurements; and
based at least in part on the determining the particular IMU is in the failure state, setting the particular IMU of the plurality of IMUs to an invalid status,
wherein the determining the primary IMU of the plurality of IMUs does not determine the particular IMU to be the primary IMU based at least in part on the invalid status.

18. The system of claim 14, wherein performing the consensus determination comprises determining, based on the IMU measurements, average IMU measurements.

* * * * *